United States Patent
Hosogi et al.

(10) Patent No.: US 10,884,630 B2
(45) Date of Patent: Jan. 5, 2021

(54) STORAGE SYSTEM

(71) Applicant: Hitachi, Ltd., Tokyo (JP)

(72) Inventors: Koji Hosogi, Tokyo (JP); Naoya Okada, Tokyo (JP); Akifumi Suzuki, Tokyo (JP); Hideyuki Koseki, Tokyo (JP); Masahiro Tsuruya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 20 days.

(21) Appl. No.: 16/332,771

(22) PCT Filed: Apr. 13, 2017

(86) PCT No.: PCT/JP2017/015122
§ 371 (c)(1),
(2) Date: Mar. 12, 2019

(87) PCT Pub. No.: WO2018/189858
PCT Pub. Date: Oct. 18, 2018

(65) Prior Publication Data
US 2019/0361611 A1    Nov. 28, 2019

(51) Int. Cl.
*G06F 12/00* (2006.01)
*G06F 3/06* (2006.01)

(52) U.S. Cl.
CPC ............ *G06F 3/0611* (2013.01); *G06F 3/064* (2013.01); *G06F 3/0619* (2013.01); *G06F 3/0631* (2013.01); *G06F 3/0652* (2013.01); *G06F 3/0659* (2013.01); *G06F 3/0683* (2013.01)

(58) Field of Classification Search
CPC .... G06F 3/0611; G06F 3/0619; G06F 3/0631; G06F 3/064; G06F 3/0652; G06F 3/0659; G06F 3/0683
See application file for complete search history.

(56) References Cited

U.S. PATENT DOCUMENTS

| | | | |
|---|---|---|---|
| 9,846,542 B2 * | 12/2017 | Seo ...................... | G06F 12/0246 |
| 2006/0282644 A1 * | 12/2006 | Wong ................... | G06F 12/0246 |
| | | | 711/206 |
| 2010/0217927 A1 * | 8/2010 | Song ..................... | G06F 3/0616 |
| | | | 711/103 |
| 2013/0290629 A1 * | 10/2013 | Uehara ................. | G06F 11/108 |
| | | | 711/114 |

(Continued)

FOREIGN PATENT DOCUMENTS

| JP | 2008146254 A | * | 6/2008 |
|---|---|---|---|
| JP | 2015-204118 A | | 11/2015 |
| WO | 2016/163016 A1 | | 10/2016 |

*Primary Examiner* — Mano Padmanabhan
*Assistant Examiner* — Mohammad S Hasan
(74) *Attorney, Agent, or Firm* — Procopio, Cory, Hargreaves & Savitch LLP (57) ABSTRACT

A storage system includes a controller and a nonvolatile memory drive, in which the controller transmits a write request that designates a volume identifier of a volume to be provided to a host, to the nonvolatile memory drive; the nonvolatile memory drive exclusively allocates a free block selected from a plurality of blocks to the volume identifier; write data of the write request is written to the free block; when the write data is update write data, an area that stores data to be updated is changed to an invalid data area; and after valid data of a block including the invalid data area is migrated to another block, all data of the block including the invalid data area is erased.

10 Claims, 8 Drawing Sheets

(56) References Cited

U.S. PATENT DOCUMENTS

| | | | |
|---|---|---|---|
| 2014/0047166 A1* | 2/2014 | Asnaashari | G06F 12/0246 |
| | | | 711/103 |
| 2014/0156965 A1* | 6/2014 | Yang | G06F 3/064 |
| | | | 711/172 |
| 2014/0189263 A1* | 7/2014 | Shaharabany | G06F 3/0656 |
| | | | 711/154 |
| 2015/0293713 A1 | 10/2015 | Seo et al. | |
| 2015/0347291 A1* | 12/2015 | Choi | G06F 12/0246 |
| | | | 711/103 |
| 2017/0160933 A1* | 6/2017 | De Jong | G06F 9/467 |
| 2018/0039444 A1 | 2/2018 | Yamamoto et al. | |
| 2018/0121351 A1* | 5/2018 | Zhang | G11C 8/06 |
| 2018/0260134 A1* | 9/2018 | Li | G11C 16/3418 |
| 2020/0034076 A1* | 1/2020 | Zentz | G06F 3/0604 |

\* cited by examiner

PHYSICAL BLOCK ALLOCATION INFORMATION

[FIG. 5B]

| NAMESPACE IDENTIFICATION NUMBER | RECORD TYPE | SPECIFIED SPARE AREA RATIO | CURRENT ALLOCATION CAPACITY | CURRENT VALID DATA CAPACITY | WRITING BLOCK IDENTIFICATION NUMBER | WRITING BLOCK WRITE POINTER |
|---|---|---|---|---|---|---|
| 1 | SLC | 0.25 | 100 | 90 | 10 | 256 |
| 2 | SLC | 0.25 | 100 | 100 | 5 | 256 |
| 3 | MLC | 0.15 | 200 | 190 | 30 | 256 |
| 4 | MLC | 0.10 | 300 | 290 | 12 | 256 |
| 5 | TLC | 0.05 | 500 | 490 | 15 | 256 |
| 6 | TLC | 0.05 | 500 | 490 | 19 | 256 |

NAMESPACE MANAGEMENT TABLE

[FIG. 5C]

| BLOCK IDENTIFICATION NUMBER 2751 | ALLOCATION NAMESPACE 2752 | CURRENT WRITING BLOCK 2753 | NEXT ALLOCATION BLOCK 2754 |
|---|---|---|---|
| 0 | 0 | | |
| 1 | 0 | ✷ | |
| 2 | 1 | | |
| 3 | 2 | | |
| 4 | 1 | ✷ | |
| 5 | 0 | | |
| 6 | 2 | | |
| 7 | 2 | ✷ | |
| 8 | | | ✷ |
| ... | ... | ... | ... |

PHYSICAL BLOCK MANAGEMENT TABLE

STORAGE SYSTEM

CROSS-REFERENCE TO RELATED APPLICATIONS

This application is a U.S. National Stage entry of PCT Application No: PCT/JP2017/015122 filed Apr. 13, 2017, the contents of which are incorporated herein by reference.

TECHNICAL FIELD

The present invention relates to a storage system.

BACKGROUND ART

A flash memory that is one of nonvolatile memories mainly has two types of configurations. One is the NOR flash memory that can perform random write, but has a low degree of integration. The other is the NAND flash memory (hereinafter referred to as NAND flash) that only allows sequential write, but has a high degree of integration. The NAND flash, which is easy to have a large capacity because of the high degree of integration, is widely used as a final storage medium of a storage system since the performance of random access is sufficiently high as compared with a hard disk drive.

The NAND flash has a function of improving data capacity efficiency, which is referred to as garbage collection (GC). Since GC is a background process that is operated asynchronously and independently of a normal I/O access, the I/O performance deteriorates when GC is performed concurrently with the normal I/O access.

In a technique disclosed in PTL 1, lifetime information of write data is added to each I/O write command issued by a host, and blocks that stores lifetime respectively are allocated, in order to prevent generation of a missing block that stores invalid data and to improve the capacity efficiency. Further, in the technique disclosed in PTL 1, the capacity efficiency is improved by selecting a different multi-level bit cell, such as an SLC or an MLC in a block to be allocated, according to the lifetime.

According to a technique disclosed in PTL 2, the performance and endurance of NAND flash are improved by dynamically selecting or rearranging a multi-level type of storage destination block such as a Single Level Cell (SLC) or a Triple Level Cell (TLC) according to a write frequency of an I/O access issued by a host and a predicted value thereof.

PRIOR ART LITERATURE

Patent Literature

PTL 1: JP-A-2015-204118
PTL 2: WO2016/163016

SUMMARY OF INVENTION

Technical Problem

The NAND flash has a plurality of physical hierarchical structures. The minimum unit is a bit cell, and the SLC type flash memory can store 1 bit of data. In recent years, the multi-level technology has been advanced. A Multi-Level Cell (MLC) can store 2 bits of data, a TLC can store 3 bits of data, and a Quad Level Cell (QLC) can store 4 bits of data.

The NAND flash has a hierarchy called page composed of a plurality of bit cells, and performs reading and writing of data (program) in unit of a page. The NAND flash has a hierarchy called block composed of a plurality of pages, and performs erasing of data (erasing) in unit of a block. The NAND flash basically only allows sequential write for data writing to a block. A plurality of blocks are arranged in a die of the NAND flash.

Due to the constraint that erasing and sequential write can only be performed in unit of the block, the NAND flash configures an allocable logical capacity with an actual data storage capacity and a spare capacity, and requires a larger physical capacity. In order to allow random write from a host device, the NAND flash has an address conversion mechanism that pairs a logical address (logical page location) and a physical page location (physical address) that actually stores data, and manages an address relationship between the logical address and the physical page location.

When writing is performed again for a logical address that is the same as the logical address stored in the past, that is, when an update write happens, the NAND flash having the address conversion mechanism performs mapping between a new physical page location in which updated data is stored and the logical address by pairing the new physical page location with the logical address. As a result, it is determined that the old data stored in the old physical page location is invalid.

The old data (invalid data) remains stored in the physical page, and the physical page remains a useless physical area until block data erasure is performed in the future. The block in which the invalid data is stored is a missing block, and a limited physical capacity is compressed. That is, the capacity efficiency decreases.

The NAND flash performs GC that generates a new block that can be newly written, corresponding to the physical capacity compression. The GC sequentially replicates the valid data stored in the missing block to the new block, and erases the block at a time point when all data of the missing block becomes invalid.

As an example, a storage system connected to a server that uses server virtualization or a container is assumed. In this environment, a plurality of virtual machines, to each of which a logical volume is allocated, are started at the same time, and each virtual machine accesses the storage system with a different workload (I/O).

Aspects (feature) of the workload are different for each virtual machine. The workload is, for example, a read main body or a write main body, and/or a volatile memory assumption or a nonvolatile memory assumption. The aspects of the workload also depend on a redundancy method. The workload may also be a replication by software used in an HDFS file system for a database. Therefore, in the server virtualizationor the container environment, workloads of these different aspects coexist.

In the technique disclosed in PTL 1, since a host accesses by adding life cycle information indicating a write frequency for each I/O command, complexity of the host process increases. Further, when a plurality of workloads are distributed and stored in SLC blocks or MLC blocks, workloads having different lifetimes for different logical volumes are stored in a coexisting manner in one SLC block or MLC block. For this reason, there is a high probability of potentially becoming a missing block, and performance deterioration due to GC is likely to occur.

Similarly, in the technique disclosed in PTL 2, since different workloads are stored in the same SLC block or MLC block, or in a different hierarchy, there is a high probability of becoming a missing block, and performance deterioration due to GC is likely to occur.

Therefore, in an environment in which access to a plurality of volumes coexists, a technology capable of reducing the GC start frequency in the flash memory drive and improving the I/O access performance and endurance is desired.

Means for Solving Problems

A storage system of one embodiment is a storage system including a controller and a nonvolatile memory drive, in which the controller transmits a write request that designates a volume identifier of a volume to be provided to a host, to the nonvolatile memory drive; the nonvolatile memory drive exclusively allocates a free block selected from a plurality of blocks to the volume identifier; write data of the write request is written to the free block; when the write data is update write data, an area that stores data to be updated is changed to an invalid data area; and after valid data of a block including the invalid data area is migrated to another block, all data of the block including the invalid data area is erased.

Advantageous Effect

According to one aspect of the invention, garbage collection start frequency in the flash memory drive can be lowered, and the I/O access performance and endurance can be improved.

DESCRIPTION OF EMBODIMENTS

Hereinafter, one embodiment of the invention will be described with reference to the drawings. It should be noted that the embodiment is only an example for carrying out the invention and the technical scope of the invention is not limited thereto. Further, the embodiment of the invention may be implemented by software running on a general-purpose computer, or may be implemented by dedicated hardware. Further, the embodiment of the invention may be implemented by a combination of the software and the hardware.

In the embodiment, a storage system allocates a unique identification number to a target logical volume. In the present disclosure, the unique identification number is referred to as a namespace identification number. The storage system accesses a flash memory drive by adding a namespace identification number corresponding to the target logical volume.

The flash memory drive allocates a new physical block to the namespace identification number. One physical block is allocated to only one namespace identification number (volume) (exclusive allocation). That is, the flash memory drive stores write data for different volumes in different physical blocks. The physical block is a final storage medium of the write data.

In a workload in which access to a plurality of volumes having different data life cycles coexists, different workloads are inhibited from being stored in the same physical block, GC start is inhibited by preventing frequency of occurrence of missing blocks as a result thereof, and I/O access performance and endurance are improved.

In one example, when allocating a volume in a storage system to a connected server, the storage system receives, from the server, volume information including hint information that indicates a capacity of the volume and a feature of access (workload) to the volume.

The storage system determines an allocation policy of a flash memory block to a target volume based on target volume information. The policy to be determined specifies, for example, a multi-level type of memory cell and/or a specified spare area ratio. The flash memory drive newly allocates a physical block to the target volume based on the determined allocation policy. The capacity efficiency and endurance of the flash memory drive can be improved by the allocation of the physical block corresponding to the workload.

Figure 1:
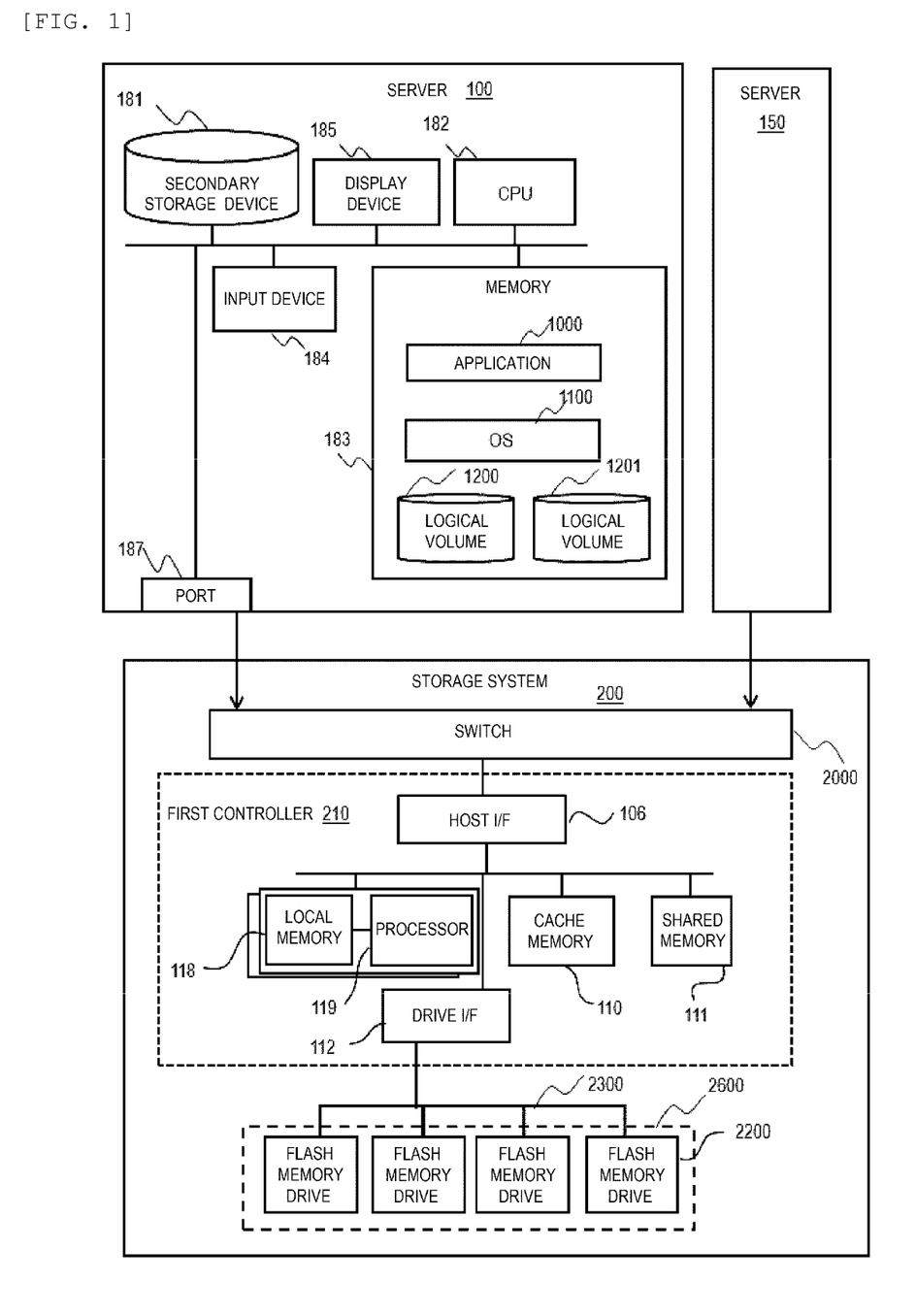
FIG. 1 is a diagram for illustrating a computer system in an embodiment.

FIG. 1 is a diagram for illustrating a system of the embodiment. A plurality of servers 100, 150, and a storage system 200 are connected by a switch 2000 in the storage system 200. The servers 100, 150, and the storage system 200 may be connected by, for example, a Storage Area Network (SAN). The number of the servers is any number equal to or higher than 1.

The servers 100, 150 basically have the same configuration. The servers 100, 150 can have a typical computer configuration. FIG. 1 illustrates components of the server 100. The server 100 includes a secondary storage device 181, a CPU 182 that is a processor, a memory 183 that is a main memory, an input device 184, a display device 185 that is an output device, and a port 187. The components of the server 100 are connected to each other by an internal network.

The CPU 182 performs various processes by executing a program stored in the memory 183. For example, the memory 183 stores an operating system (OS) 1100 and an application 1000. The OS 1100 controls the entire server. The application 1000 operates on the OS 1100. The number of applications in the server depends on the design, and one application may be a virtual machine.

In the server 100, two logical volumes 1200, 1201 are defined. As will be described below, the logical volumes 1200, 1201 are allocated to a physical storage area via a logical volume provided by the storage system 200. The logical volumes 1200, 1201 are managed by the OS 1100.

The application 1000 reads and writes data from and to a volume provided by the storage system 200, via the OS 1100 and the logical volume 1200 or 1201. The port 187 is an interface connected to the storage system 200, and transmits and receives data and requests to and from the storage system 200.

The servers 100, 150 issue I/O requests such as a read request and a write request to the storage system 200. The storage system 200 stores and transfers data in accordance with an input I/O request.

The storage system 200 provides 1 or more logical volumes for each server. A capacity of the logical volume may or may not be virtualized. The storage system 200 includes a first controller 210 and a flash memory drive 2200 in addition to the switch 2000.

The first controller 210 receives an I/O access from the server, and performs the I/O access to the target flash memory drive 2200 via a command interface 2300 that transmits a control signal and a data signal to the flash memory drive 2200. The first controller 210 transmits a logical address used for referring to memory, and a namespace identification number to be described later. The first controller 210 includes a command to allocate a logical volume corresponding to the namespace identification number to the command interface 2300. This function will be described below.

The first controller 210 includes a host interface (I/F) 106, a cache memory 110, a shared memory 111, a drive I/F 112, a local memory 118, and a processor 119. These hardware configurations may be redundant. FIG. 1 illustrates a pair of the local memory 118 and the processor 119 as an example. These components are connected to each other by a bus.

The host I/F 106 is used by the storage system 200 to communicate with an initiator (server). A command issued by a server to access a volume reaches the host I/F 106. The storage system 200 returns information (response) from the host I/F 106 to the server.

The cache memory 110 includes, for example, a Random Access Memory (RAM) or the like, and temporarily stores data read from and written to the flash memory drive 2200. The shared memory 111 includes a hard disk, a flash memory, an RAM or the like, and stores a program to be executed by the processor 119, and configuration information.

The processor 119 executes a program used for performing various kinds of control of the storage system 200. The local memory 118 temporarily stores the program executed by the processor 119 and information used by the processor 119.

The cache memory 110 is used for temporarily storing write data for a logical volume (flash memory drive 2200) or data (read data) read from a logical volume (flash memory drive 2200). A volatile memory such as a DRAM or an SRAM, or a nonvolatile memory may be used as the cache memory 110.

The shared memory 111 provides a storage area used for storing management information used by the processor 119. Similar to the cache memory 110, a volatile memory such as the DRAM or the SRAM, or a nonvolatile memory may be used as the shared memory 111. Unlike the local memory 118, the cache memory 110 and the shared memory 111 are accessible from any processor 119.

The flash memory drive 2200 is a storage drive (storage device) including a nonvolatile storage medium used for finally storing write data from a server. It is assumed that the first controller 210 has an RAID function capable of restoring data of the flash memory drive 2200 even if one flash memory drive 2200 fails.

A plurality of flash memory drives 2200 constitute one RAID group. The flash memory drive 2200 has flash memory as a storage medium. In this example, the flash memory drive 2200 includes a NAND flash memory, and an example of a flash memory drive is a Solid State Drive (SSD). The flash memory drive 2200 provides one or more logical storage areas based on an RAID group. The logical storage area is associated with a physical storage area of the RAID group.

Figure 2A:
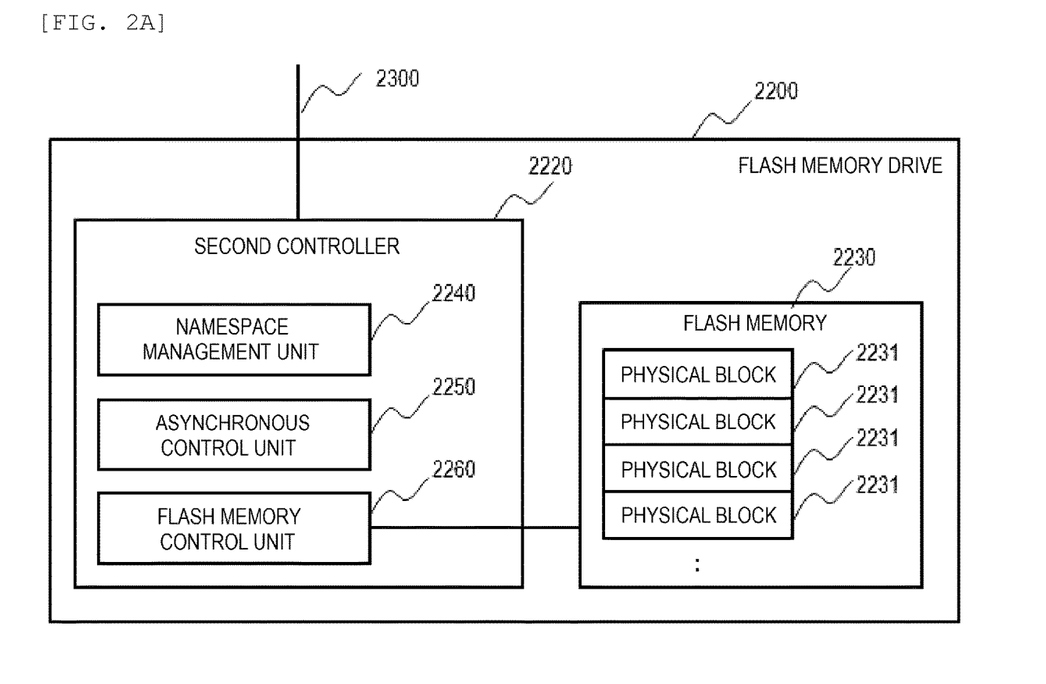
FIG. 2A is a diagram for illustrating a flash memory drive in the embodiment.

FIG. 2A is a diagram for illustrating the flash memory drive 2200. The flash memory drive 2200 receives a command (request) input from the first controller 210, and flash memory 2230 is accessed under the control of a second controller 2220. The flash memory 2230 is a memory having a flash memory as a storage medium, and includes one or a plurality of dies. The flash memory 2230 is divided into a plurality of physical blocks 2231. The physical block is an erasure unit of data.

The second controller 2220 includes three main functional units. A namespace management unit 2240 manages the allocation method of the physical block for each namespace identification number allocated to a logical volume. An asynchronous control unit 2250 asynchronously starts block refresh and block erasure of the flash memory. A flash memory control unit 2260 controls the flash memory 2230. The flash memory control unit 2260 will be described below.

A refresh command issued by the asynchronous control unit 2250 is a command used for migrating valid data of a target block to a new block and erasing data of the target block, when elapsed time since a first writing of the target block exceeds a threshold. The reliability of the flash memory is improved by the refresh command.

The function of erasing the target block by the refresh or GC process to be described below after all page data in the block becomes invalid is referred to as block erasure. For example, when the invalid data of the target block reaches a threshold, the asynchronous control unit 2250 performs the GC process. The refresh, GC process, and block erasure can be performed independently of an I/O command, and the asynchronous control unit 2250 controls these processes as asynchronous processes.

Figure 2B:
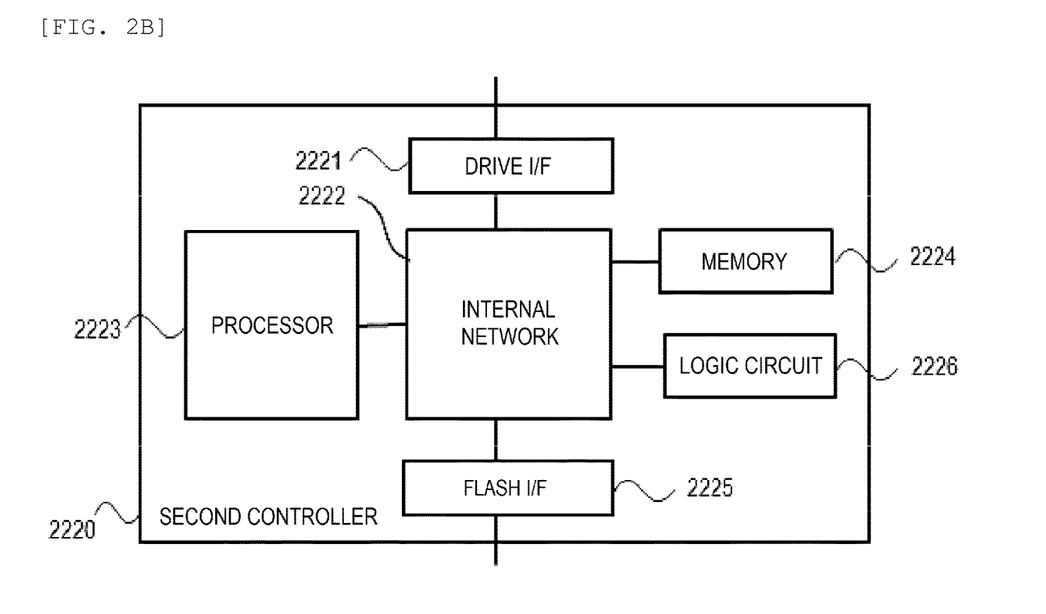
FIG. 2B is a diagram for illustrating a hardware configuration of a second controller 2220 in the embodiment.

FIG. 2B is a diagram for illustrating a hardware configuration of the second controller 2220. The second controller 2220 includes a drive I/F 2221, a processor 2223, a memory 2224, a flash I/F 2225, and a logic circuit 2226 having a compression function, which are connected to each other via an internal network 2222. The compression function may be omitted.

The drive I/F 2221 is an interface device used for communicating with the first controller 210. The flash I/F 2225 is an interface device for the second controller 2220 to communicate with the flash memory 2230.

The processor 2223 executes a program used for controlling the flash memory drive 2200. Memory 2224 stores the program executed by the processor 2223, control information used by the processor 2223, or the like. The namespace management unit 2240, the asynchronous control unit 2250, and the flash memory control unit 2260 are realized by the processor 2223 executing a program.

Figure 3:
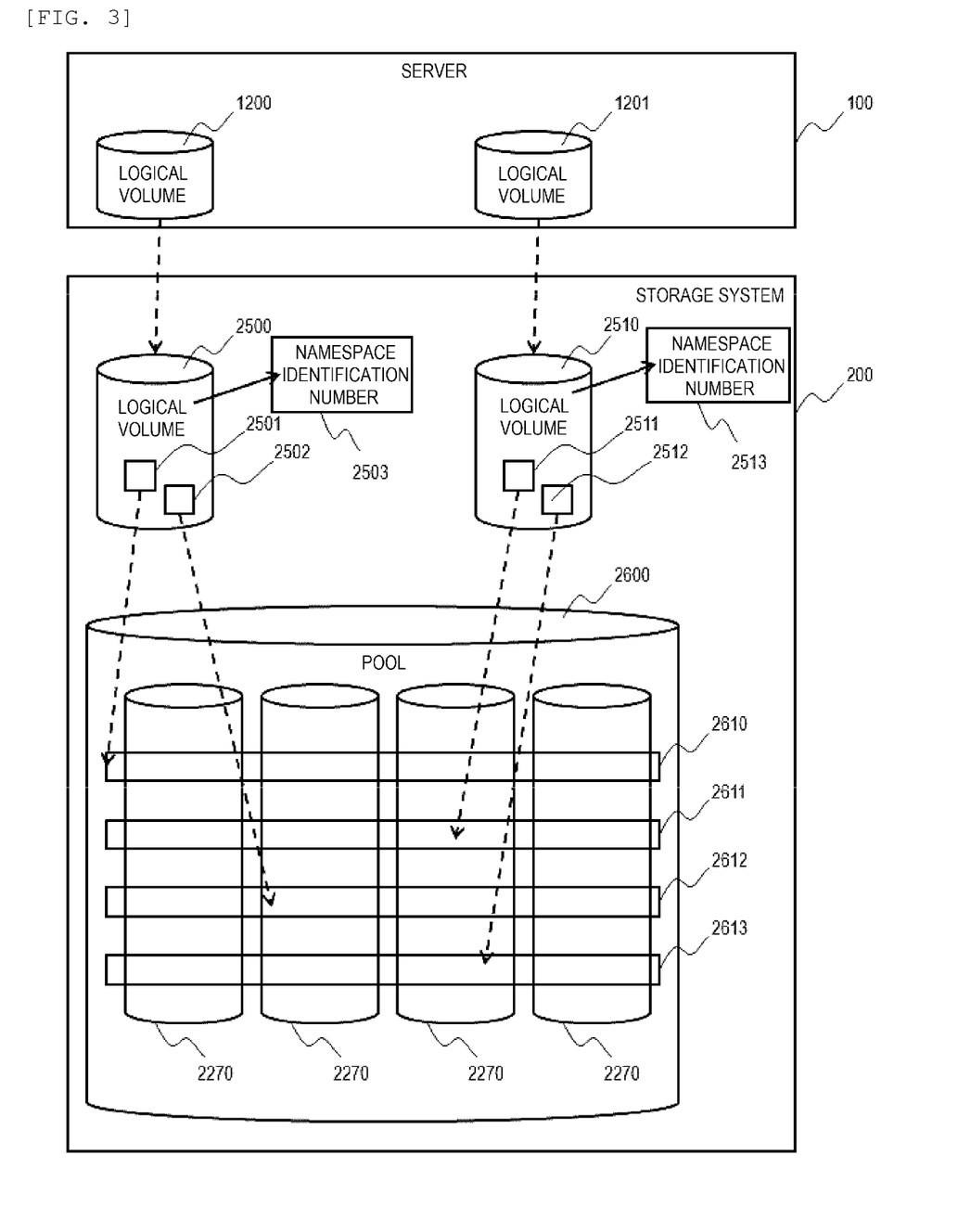
FIG. 3 is a diagram for illustrating a relationship between a logical volume in a server and an arrangement method of data in a storage system in the embodiment.

FIG. 3 is a diagram for illustrating a relationship between a logical volume in the server 100 and data arrangement in the storage system 200 in the embodiment. The server 100 instructs the storage system 200 to allocate a logical volume in the storage system 200 for a logical volume in the server. When the storage system 200 receives the allocation instruction of the logical volumes 1200, 1201, logical volumes 2500, 2510 are allocated. The logical volume allocation instruction instructs that a new volume is newly defined and allocated or an existing logical volume is changed and allocated in the storage system 200.

The storage system 200 includes a capacity pool (also simply referred to as a pool) 2600, and a plurality of flash memory drives 2200 are allocated to the pool 2600. The pool 2600 includes logical storage areas (logical address space) 2270 of the allocated flash memory drive 2200. The logical storage area 2270 is a logical storage area provided by the flash memory drive 2200 to an outer unit (first controller 210).

A plurality of flash memory drives 2200 constitute one RAID group. For example, stripe lines 2610, 2612 extending over the plurality of (logical storage areas 2270 of) flash memory drives 2200 are allocated to logical address areas 2501, 2502 in the logical volume 2500 respectively. Stripe lines 2611, 2613 are allocated to logical address areas 2511, 2512 in the logical volume 2510 respectively.

The stripe line is a set of data blocks including one or a plurality of parities, and in the stripe line, a lost data block can be restored based on other data blocks. At the same time, the number of data blocks that can be restored depends on a degree of redundancy (parity number).

The logical volumes 2500, 2510 are allocated in the pool 2600 across the logical storage areas 2270 of a plurality of flash memory drives, and are also allocated to dispersed areas in the logical storage area 2270 of one flash. That is, in one flash memory drive 2200, one logical volume is allocated to a random address area instead of being allocated to a continuous logical address area.

In the embodiment, when allocating the logical volumes 2500, 2510 in the storage to the logical volumes 1200, 1201 in the server, the first controller assigns unique namespace identification numbers 2503, 2513 to the logical volumes 2500, 2510, respectively. The logical volumes 2500, 2510 can be uniquely identified with the namespace identification numbers 2503, 2513.

Figure 4:
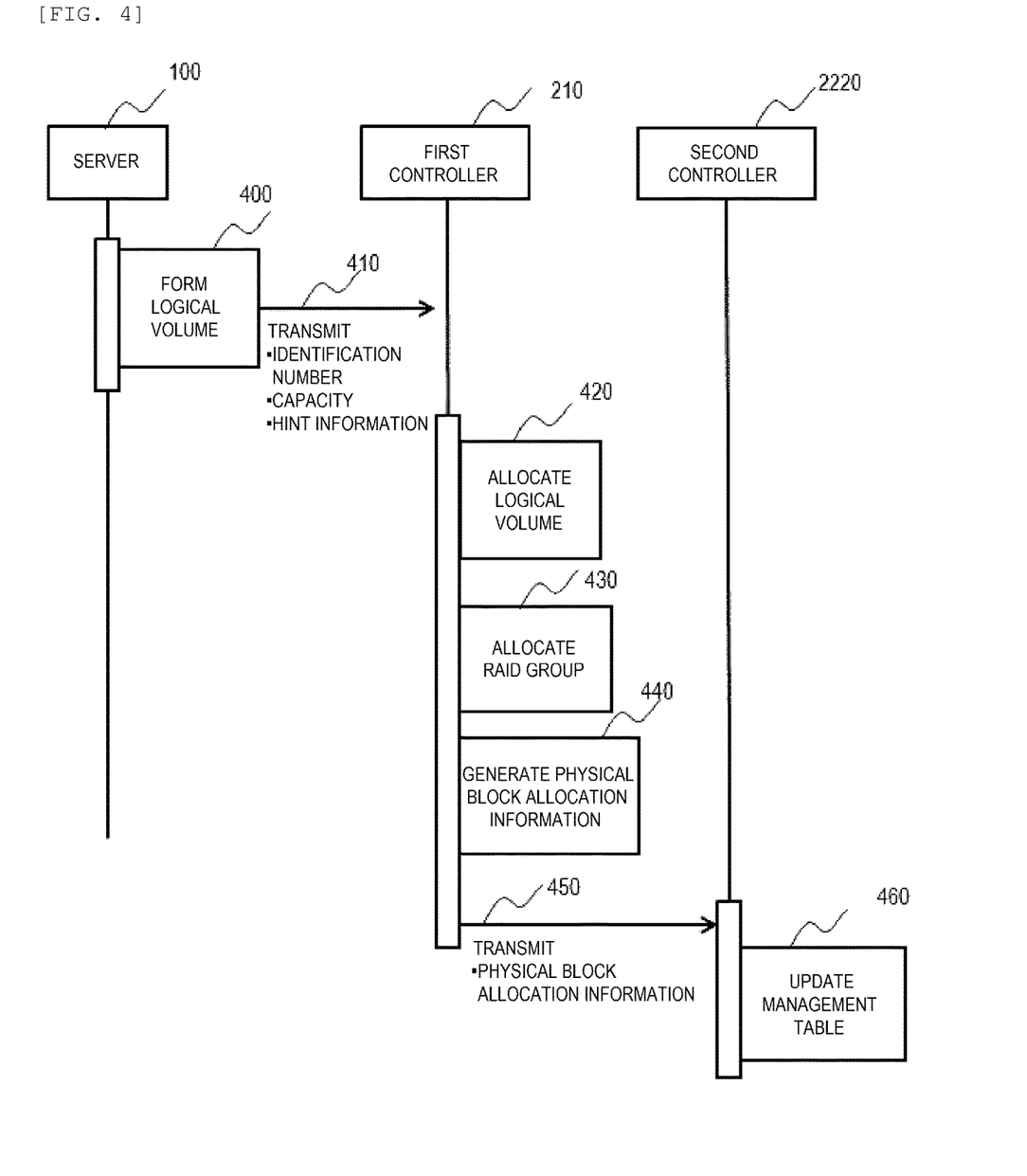
FIG. 4 is a diagram for illustrating a sequence when the server allocates the logical volume.

FIG. 4 is a diagram for illustrating a sequence of allocating a physical storage area of the storage system 200 to the logical volume 1200 of the server 100. This sequence is executed among the server 100, the first controller 210 in the storage system 200, and the second controller 2220 in the flash memory drive 2200.

The server 100 forms a logical volume (400). The server 100 transmits logical volume information, which includes an identification number and a capacity of the formed logical volume and logical volume hint information indicating a feature of an access (workload) to the logical volume, to the storage system 200 (410).

The logical volume hint information indicates, for example, information of an update write (reprogramming write) frequency for the volume. The update write frequency information indicates, for example, one selected from no reprogramming (write-once), reprogramming (low frequency) and reprogramming (high frequency). The reprogramming (low frequency) indicates that an assumed reprogramming frequency is lower than a threshold (a reprogramming average period is higher than the threshold). The reprogramming (high frequency) indicates that the assumed reprogramming frequency is equal to or higher than the threshold (the reprogramming average period is equal to or smaller than the threshold). The threshold, for example, is a refresh frequency (during refresh).

The first controller 210 in the storage system 200 allocates a corresponding RAID group based on the logical volume information (430), and further generates physical block allocation information (440). The first controller 210 includes a unique namespace identification number in the physical block allocation information. The physical block allocation information indicates a physical block allocation policy for the namespace identification number. Details of the physical block allocation information will be described below.

The first controller 210 forwards the physical block allocation information to the second controller 2220 in each flash memory drive 2200 of the RAID group (450). The second controller 2220 stores the input physical block allocation information in an internal namespace management table (460).

Figure 5A:
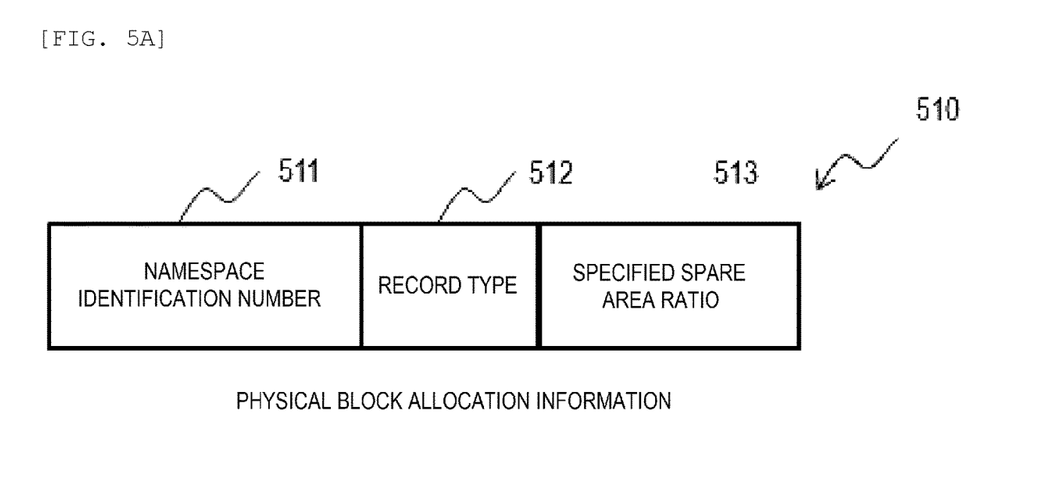
FIG. 5A is a diagram for illustrating physical block allocation information.

FIG. 5A is a diagram for illustrating a format example of physical block allocation information 510. The physical block allocation information 510 has a namespace identification number field 511, a record type field 512, and a specified spare area ratio field 513. The namespace identification number field 511 indicates a namespace identification number given to a logical volume in the storage.

The record type field 512 indicates a multi-level record type of block (cell) that stores data of the logical volume in the storage. For example, an SLC that stores 1 value in a 1-bit cell, an MLC that stores 2 values in a 1-bit cell, a TLC that stores 3 values in a 1-bit cell, or a QLC that stores 4 values in a 1-bit cell is shown.

In general, as the multi-level bit cell advances from the SLC to the QLC, the number of times of writing to the bit cell is reduced and the reliability of data is also decreased. On the other hand, as multi-level increases, the amount of data stored per bit cell is increased. Therefore, it is desirable to select a multi-level recording method according to the update frequency.

For example, when repetitive update writing occurs, the SLC having a large number of times of allowable writing is used, and when repetitive writing such as write-once does not occur, the QLC or TLC having good capacity effect is used. Accordingly, it is possible to store optimum data within the number of times of allowable writing. Since the characteristics of each multi-level recording method vary depending on the miniaturization trend of the flash memory and the physical configuration such as the 3D structure, it is desirable to use a selection algorithm according to the flash memory to be selected.

The first controller 210 determines a value of the record type field 512 based on the update write frequency information indicated by the logical volume hint information. For example, it is assumed that the flash memory drive 2200 supports the SLC, the MLC, and the TLC. When the update write frequency information indicates no reprogramming (write-once), the first controller 210 sets the TCL in the record type field 512.

When the update write frequency information indicates reprogramming (low frequency), the first controller 210 sets the MCL in the record type field 512. When the update write frequency information indicates reprogramming (high frequency), the first controller 210 sets the SLC in the record type field 512.

The specified spare area ratio field 513 indicates a specified value of a capacity proportion of a spare area in a physical storage area allocated to a namespace identification number. The flash memory drive 2200 allocates a physical storage area of the flash memory 2230 to a namespace identification number (logical volume) in units of blocks. The allocated storage area includes an area where valid data is stored, an area where invalid data due to the update write is stored, and a free area. The spare area is a storage area other than the area where valid data is stored, and the spare area ratio indicates an approximate invalid data area capacity ratio.

The flash memory drive 2200 changes the capacity of the physical storage area to be allocated according to a valid data amount of the logical volume. The flash memory drive 2200 allocates a new free block for writing new data, and opens a block in which data has been erased by the GC. As will be described below, the specified spare area ratio is referred to in determination of allocation of the new block to a namespace identification number (logical volume).

The first controller 210 determines a value of the specified spare area ratio field 513 based on the update write frequency information indicated by the logical volume hint information. The lower the update frequency is, the smaller the specified spare area ratio is given by the first controller 210.

When the update frequency is high, the capacity of an invalid area is increased, and a probability that the free block is depleted is increased. Therefore, when the update write frequency is high, the first controller 210 gives a large specified spare area ratio.

On the other hand, when the update frequency is low or there is no update write, data migrating is basically performed by refresh. Further, there is a low probability that an invalid block is present in a migrating source block. Therefore, a migrating source valid data amount in the refresh process is almost equal to a capacity of a migrating destination block, and a number of free blocks can be sufficiently secured even in a case of data migrating with a small capacity. Therefore, the first controller 210 allocates a small specified spare area ratio to a logical volume having a low update frequency.

Figure 5B:
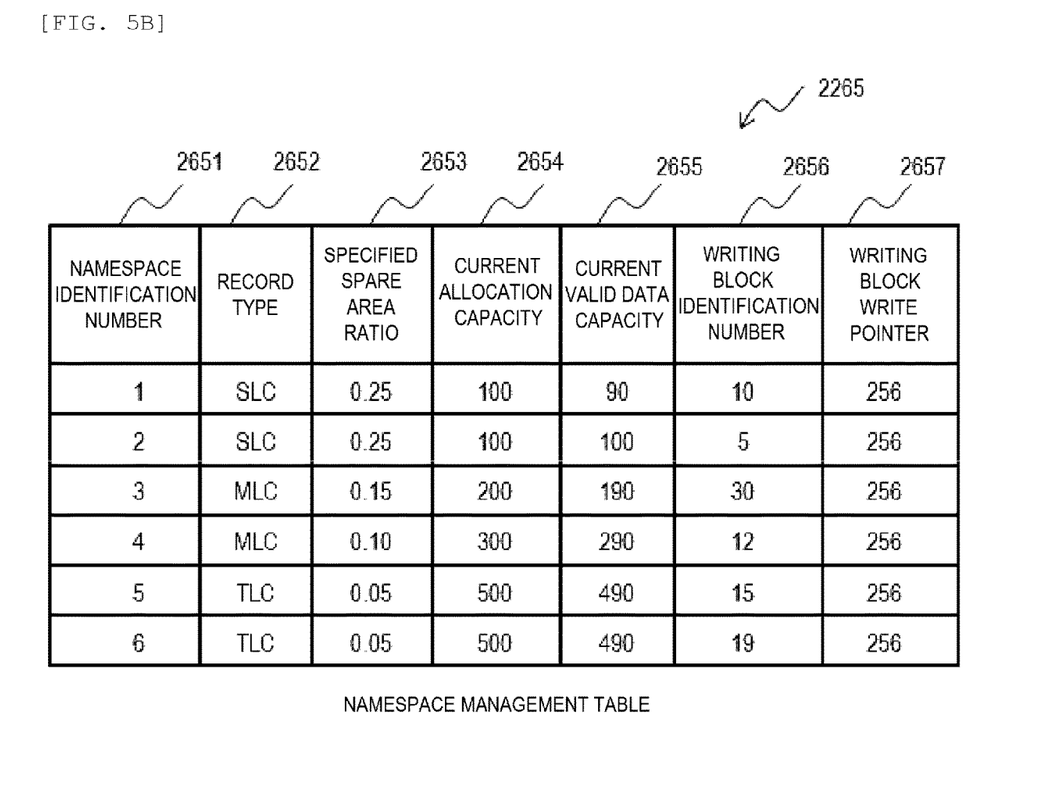
FIG. 5B is a diagram for illustrating a format of a namespace management table.

FIG. 5B is a diagram for illustrating a format example of a namespace management table 2265. The namespace management table 2265 manages information about a storage area allocated to each namespace number (logical volume) in the flash memory drive 2200.

The namespace management table 2265 has a plurality of columns. Information indicated by a namespace identification number column 2651, a record type column 2652, and a specified spare area ratio column 2653 is the same as that indicated by corresponding field of the physical block allocation information 510. The namespace management unit 2240 adds a new entry including received information of the physical block allocation information 510 to the namespace management table 2265.

A current allocation capacity column 2654 and a current valid data capacity column 2655 indicate current profiles regarding a capacity of a storage area allocated to a namespace identification number. The current allocation capacity indicates a capacity of the storage area allocated to the namespace identification number. The current valid data capacity indicates a capacity of the storage area that stores valid data.

The flash memory control unit 2260 increases a value of the current allocation capacity column 2654 when a new physical storage area (block unit) is allocated, and decreases the value by block erasure. The flash memory control unit 2260 increases a value of the current valid data capacity column 2655 for each new writing to a logical volume indicated by a namespace identification number, and decreases the value by data erasure according to an I/O request.

A writing block identification number column 2656 and a writing block write pointer column 2657 manage a next writing destination block for the logical volume indicated by the namespace identification number, and a write pointer in the writing destination block. The flash memory control unit 2260 updates the values of these columns each time new data is written.

Specifically, the writing block identification number column 2656 indicates the number of the next writing destination block for the logical volume indicated by the namespace identification number. A writing block write pointer column 2657 indicates a location in the next writing destination block for the logical volume indicated by the namespace identification number. When a value obtained by adding a new writing data size to a writing block write pointer exceeds the block capacity, allocation of a new writing block is necessary.

Figure 5C:
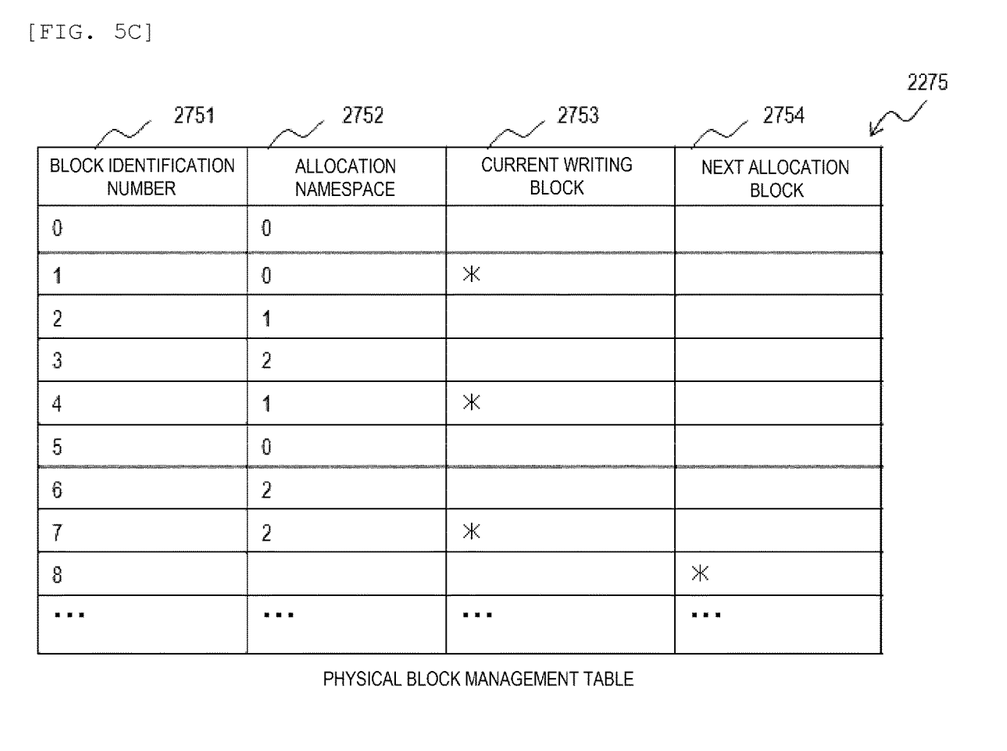
FIG. 5C is a diagram for illustrating a format of a physical block management table.

FIG. 5C is a diagram for illustrating a format example of a physical block management table 2275 that is stored and managed by the second controller 2220. The physical block management table 2275 manages physical blocks allocated to each namespace identification number, and unallocated free blocks. Each physical block that has been allocated corresponds to only one namespace identification number (exclusive correspondence). FIG. 5C illustrates an example in which a physical block multi-level record type can be changed. When the physical block multi-level record type is fixed, the physical block management table 2275 further indicates the physical block multi-level record type.

A block identification number column 2751 indicates an identification number of each physical block. An allocation namespace column 2752 indicates namespace identification numbers to which the physical blocks are allocated.
A current writing block column 2753 indicates physical blocks in which data is written, among physical blocks allocated to each namespace identification number. A next allocation block column 2754 then indicates free physical blocks allocated to the namespace identification numbers.

Figure 6:
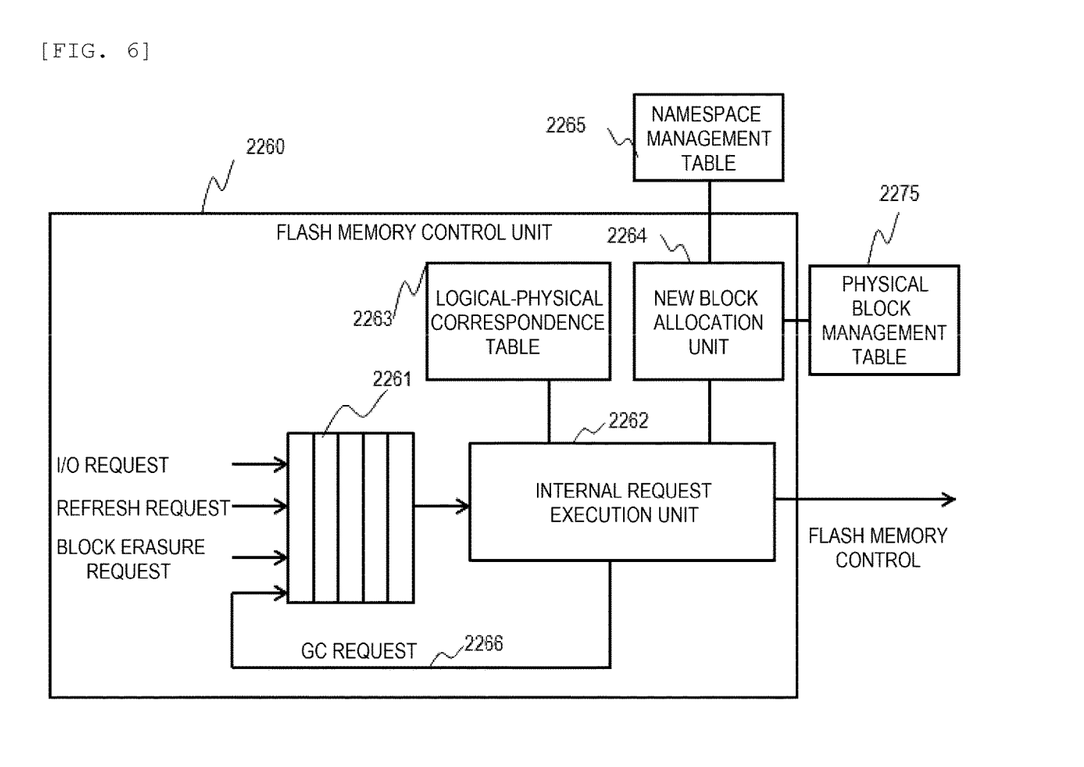
FIG. 6 is a diagram for illustrating a nonvolatile memory control unit in the embodiment.

FIG. 6 is a diagram for illustrating a logical configuration of the flash memory control unit 2260 in the embodiment. The flash memory control unit 2260 controls flash memory that is a storage medium in response to an I/O issued by the first controller 210, a request, a refresh request issued by the asynchronous control unit 2250, a block erasure request, and a GC request 2266.

These internal requests (internal commands) include op-codes that indicate namespace identification numbers, logical page numbers to be referred to, and the types of the requests. The logical page number is a page number in an address space (logical storage area) shown by the flash memory drive 2200 to the outer unit (first controller), and is a logical address. The internal requests are temporarily stored in an internal request queue 2261 and input to an internal request execution unit 2262.

The internal request execution unit 2262, which refers to nonvolatile memory in response to an input request, is connected to a logical-physical correspondence table 2263 indicating a relationship between a logical page and a physical page, and to a new block allocation unit 2264 that controls the allocation of a new block in data writing.

The new block allocation unit 2264 refers to a namespace management table 2265 indicating a policy for allocating the new block. The logical-physical correspondence table 2263 indicates a relationship between a logical page number that is allocated to each namespace identification number and a physical page number. The physical page number is an address in the flash memory drive 2200. The physical page number is the number of a physical page in the flash memory 2230, and is a physical address. The logical-physical correspondence table 2263 outputs a target physical page number based on a given namespace identification number and the logical page number.

Figure 7:
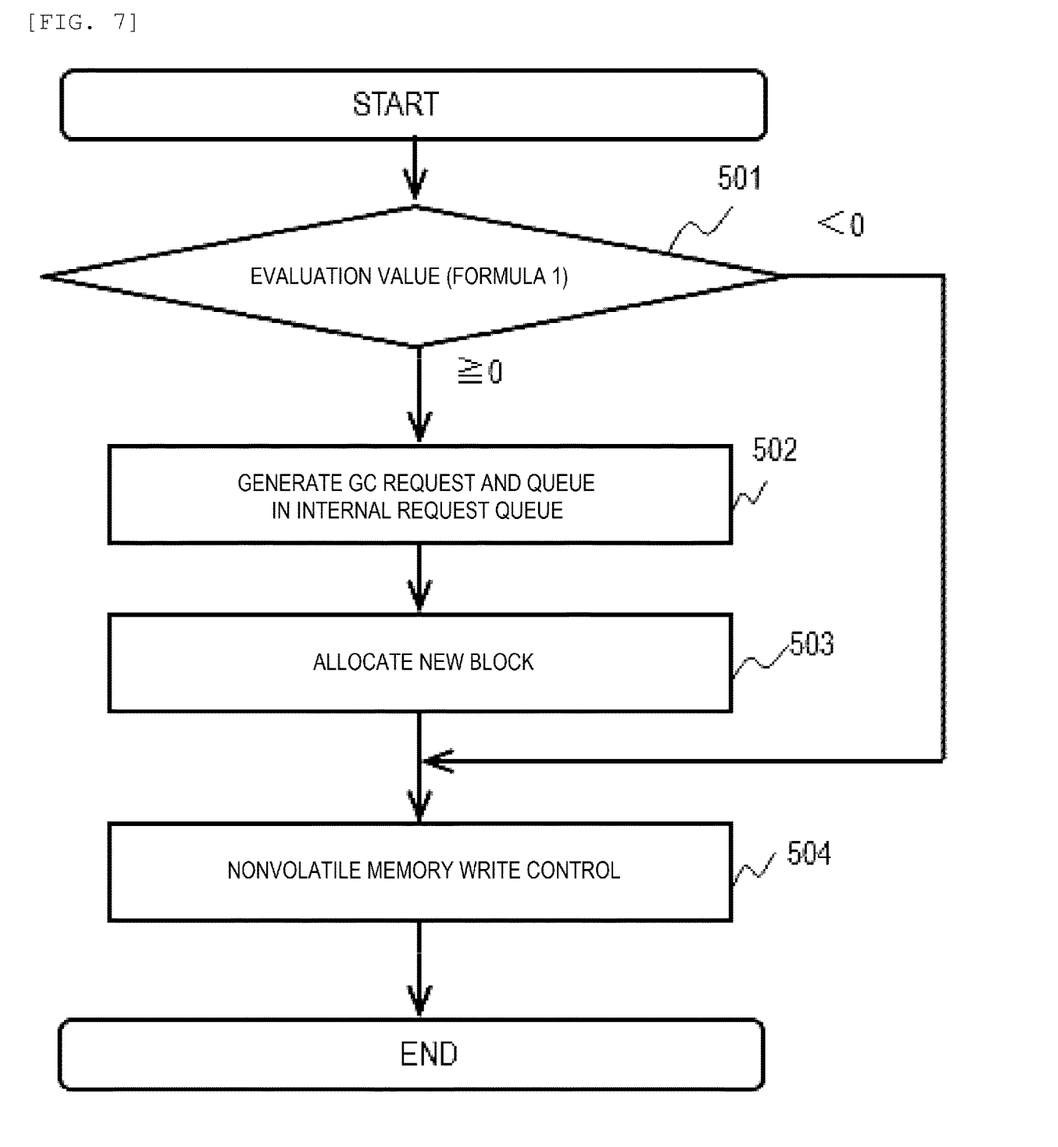
FIG. 7 is a flowchart for illustrating processing contents of the nonvolatile memory control unit in the embodiment.

FIG. 7 is a flow chart for illustrating a write process in the flash memory control unit 2260 in the embodiment. When an internal request input from the internal request queue 2261 is a write request, the internal request execution unit 2262 analyzes a value of an evaluation value represented by the following (Formula 1) (501).

$$\text{Evaluation value} = (\text{current allocation capacity}) - (\text{current valid data capacity} + \text{new data capacity}) \times (1 + \text{specified spare area ratio}) \quad \text{(Formula 1)}$$

By Formula 1, an evaluation value of whether a current allocation capacity for a logical volume indicated by a namespace identification number is insufficient for valid data. The new data capacity indicates a capacity (write data amount) of a storage area used for storing write data (new data) indicated by the write request. When the evaluation value of Formula 1 is less than 0, it is not necessary to allocate a new block. When the evaluation value of Formula 1 is equal to or higher than 0, it means an event to allocate a new writing block.

When the value of the evaluation value of Formula 1 is equal to or higher than 0 (501: ≥0), the internal request execution unit 2262 determines that a block allocated to a target namespace identification number is a GC processing target. That the current allocation capacity is small with respect to a valid data capacity means that an invalid data capacity is large. The internal request execution unit 2262 generates and inputs a GC request 2266 to the internal request queue 2261 (502). The GC request 2266 is executed later.

Next, the new block allocation unit 2264 performs a new block allocation process (503). The new block allocation unit 2264 searches the target namespace identification number in information stored in the namespace management table 2265, and allocates a new block of a multi-level record type indicated by the record type column 2652.

The new block allocated to the logical volume indicated by the namespace identification number is an unallocated free block. One block is uniquely allocated to one namespace identification number. The second controller 2220 refers to the physical block management table 2275 and selects an unallocated physical block to be newly allocated.

When the multi-level record type of each block is fixed in the flash memory 2230, the new block allocation unit 2264 selects and allocates (static allocation) a block of a multi-level record type indicated by the record type column 2652. When the block multi-level record type can be set (changeable) in the flash memory 2230, the new block allocation unit 2264 sets a block multi-level record type to a multi-level record type indicated by the record type column 2652, and then allocates the block (dynamic allocation).

Further, the new block allocation unit 2264 stores an allocated new block identification number for a target entry in the namespace management table 2265, and initializes a writing block write pointer.

Next, the flash memory control unit 2260 performs flash memory write control (504). The flash memory control unit 2260 stores data in a physical page indicated by the writing block identification number column 2656 and the writing block write pointer column 2657, and stores a physical page number thereof in a corresponding physical page number field of the logical-physical correspondence table 2263.

In addition, the flash memory control unit 2260 increments the writing block write pointer. When the value of the evaluation value is lower than 0 in step 501, steps 502 and 503 are omitted. In a read process, the flash memory control unit 2260 reads data based on the physical page number indicated by the logical-physical correspondence table 2263.

As described above, data of different logical volumes in the server are stored in different physical blocks in the flash memory 2230, and the data of different logical volumes does not coexist in one physical block. Therefore, the frequency at which data having different lifetime is stored in the same physical block can be reduced, and consequently the frequency of GC can be reduced. Furthermore, in the embodiment, the physical storage area of the flash memory can be appropriately allocated to each logical volume in accordance with the workload, and the capacity efficiency and the endurance are improved.

An NVMe standard using a PCIe interface has a field that specifies a namespace ID in addition to a logical address in the format of an I/O request. In the embodiment, an NVMe interface can be applied to the command interface 2300 between the first controller 210 and the flash memory drive 2200. Alternatively, the NVMe interface can be applied to the interface between the servers 100, 150, and the storage system 200. Instead of the namespace identification number, the namespace ID used in the NVMe interface can be used.

It should be noted that the invention is not limited to the above-described embodiments and includes various modifications. For example, the above-described embodiments have been described in detail in order to facilitate the understanding of the invention, but the invention is not necessarily limited to have all of the described configurations. A part of a configuration of one embodiment can be replaced with a configuration of another embodiment, and the configuration of another embodiment can also be added to the configuration of one embodiment. In a part of a configuration of each embodiment, another configuration can be added, removed, or replaced.

The above-described configurations, functions, processing units, or the like may be achieved by hardware by means of designing a part or all of them with, for example, an integrated circuit. The above-described configurations, functions, or the like may be achieved by software by means of interpreting and executing a program, by a processor, for achieving the respective functions. Information of programs, tables, files or the like for implementing each function can be placed in a recording device such as a memory, hard disk, and solid state drive (SSD), or a recording medium such as an IC card and an SD card.

Further, control lines and information lines shows those considered to be necessary for the description, and not all the control lines and information lines are necessarily shown on the product. In practice, almost all the configurations may be considered to be mutually connected.

The invention claimed is:

1. A storage system including a controller and a nonvolatile memory drive,
   wherein the controller transmits, to the nonvolatile memory drive, a write request that designates a first volume identifier of a first logical volume of a plurality of logical volumes to be provided to a host and block allocation information indicating a block allocation policy for the first logical volume,
   the nonvolatile memory drive exclusively allocates a free block selected from a plurality of blocks to the first volume identifier based on the block allocation information, write data of the write request is written to the free block, when the write data is update write data, an area that stores data to be updated by the update write data is changed to an invalid data area, and after valid data of a block including the invalid data area is migrated to another block, all data of the block including the invalid data area is erased.

2. The storage system according to claim 1, wherein the controller:

receives, from the host, hint information indicating a feature of a workload of a volume identified by the first volume identifier, and determines the block allocation policy for the first volume identifier based on the hint information.

3. The storage system according to claim 2, wherein the hint information indicates information of an update frequency for the volume identified by the first volume identifier.

4. The storage system according to claim 1, wherein the block allocation policy indicates a block multi-level record type, and the nonvolatile memory drive allocates a block of the multi-level record type indicated by the block allocation policy to the first volume identifier.

5. The storage system according to claim 1, wherein the block allocation policy indicates a spare area ratio for the first volume identifier, and the nonvolatile memory drive allocates a new free block to the first volume identifier based on the spare area ratio.

6. A method of controlling a storage system including a nonvolatile memory drive, wherein the nonvolatile memory drive includes a physical storage area composed of a plurality of blocks, the method comprising:

receiving a write request that designates a first volume identifier for a first logical volume of a plurality of logical volumes and block allocation information indicating a block allocation policy for the first logical volume exclusively allocating a free block selected from the plurality of blocks to one the first volume identifier based on the first volume identifier and a block allocation policy for the first volume identifier;

writing write data in the free block;

when the write data is update write data, changing an area that stores data to be updated by the update write data to an invalid data area; and after valid data of a block including the invalid data area is migrated to another block, erasing all data of the block including the invalid data area.

7. The method according to claim 6, wherein hint information indicating a feature of a workload of a volume identified by the first volume identifier is received from a host, and the block allocation policy for the first volume identifier is determined based on the hint information.

8. The method according to claim 7, wherein the hint information indicates information of an update frequency for the volume identified by the first volume identifier.

9. The method according to claim 6, wherein the block allocation policy indicates a block multi-level record type, and a block of the multi-level record type indicated by the block allocation policy is allocated to the first volume identifier.

10. The method according to claim 6, wherein the block allocation policy indicates a spare area ratio for the first volume identifier, and a new free block is allocated to the first volume identifier based on the spare area ratio.

* * * * *